Feb. 5, 1963
M. SEYMOUR
3,076,435
LIQUID DISPENSING RECEPTACLE
Filed July 11, 1961
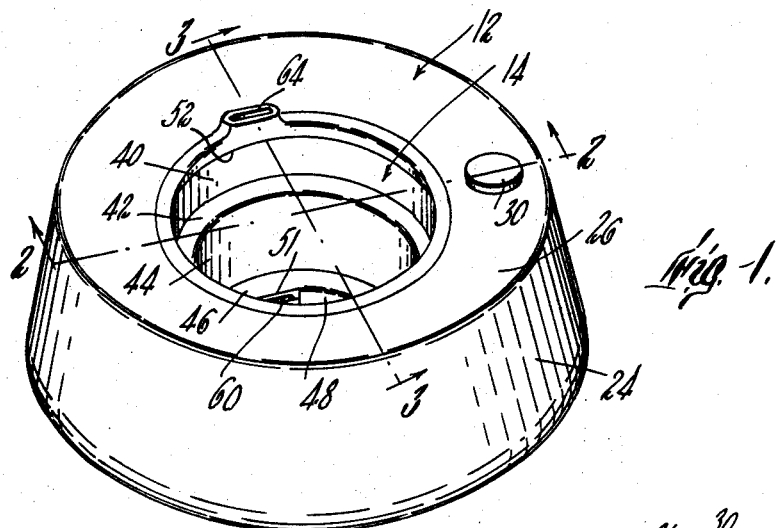
Fig. 1.
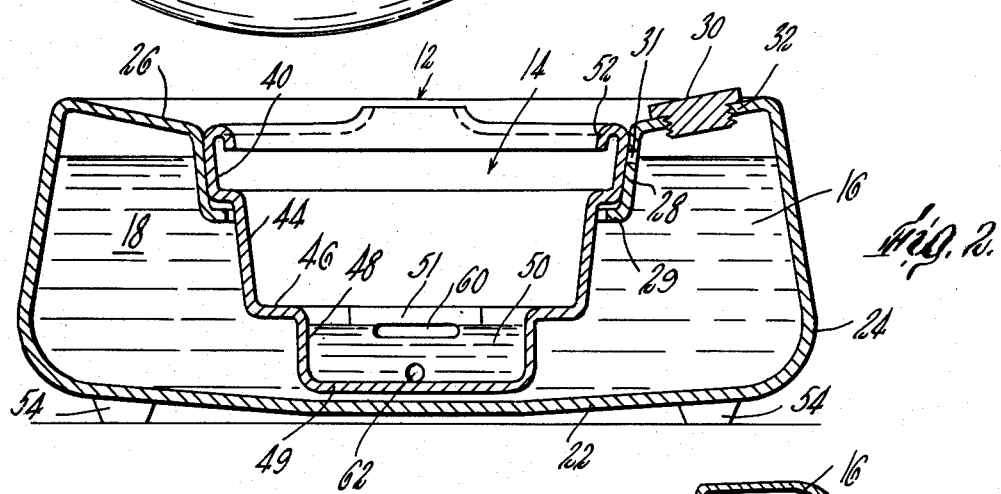
Fig. 2.
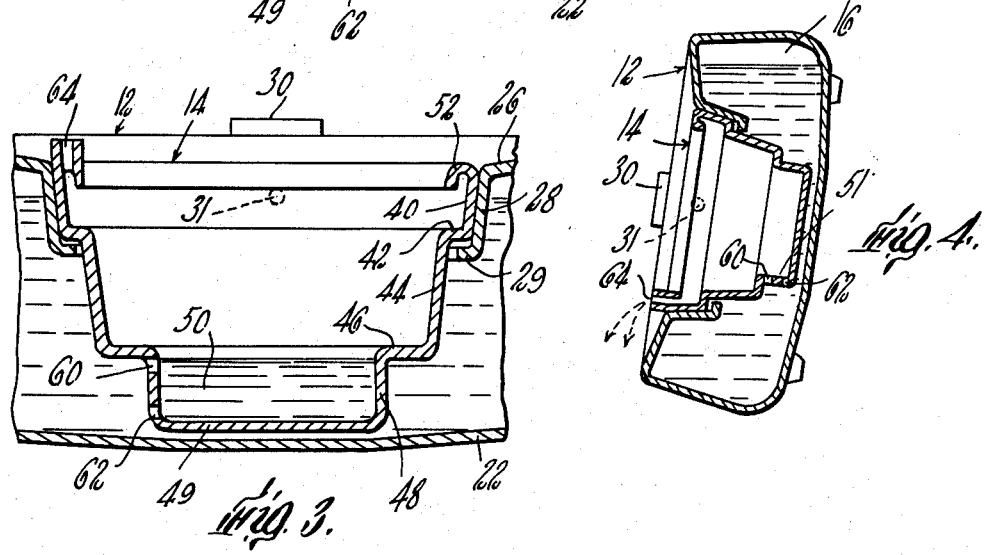
Fig. 3.
Fig. 4.

United States Patent Office 3,076,435
Patented Feb. 5, 1963

3,076,435
LIQUID DISPENSING RECEPTACLE
Malcolm Seymour, North Andover, Mass., assignor to Prototypes, Inc., South Bristol, Maine, a corporation of Maine
Filed July 11, 1961, Ser. No. 123,225
16 Claims. (Cl. 119—77)

This invention relates to a hollow, constant level liquid dispensing receptacle for use as a source of drinking water by animals such as cats and dogs.

When water is furnished animals in the usual open bowl, several hazards and inconveniences are encountered. First, a wide area of water is exposed to dust, dirt, and contamination. Secondly, evaporation proceeds according to the ambient conditions of heat and humidity. Thirdly, large open bowls and containers present a safety hazard and may be spilled either by the animal, or what is much more likely, by small children, or even adults. Spillage by animals is particularly likely to occur when the animals are restrained in cages following an operation. Many pets then are psychologically disturbed and for this reason water bowls may be denied those confined in cages simply because of the danger and inconvenience of spilled water.

Additionally, dogs and cats are poorly endowed by nature to imbibe liquids. For example, a dog must perform an awkward procedure of curling the tongue so as to capture a quantity of water and transfer as much of it as possible to the upper part of the mouth of a wave-like motion of heavier section of the tongue, where it is eventually moved into the gullet. This process is notoriously inefficient. A considerable portion of the liquid is splashed by the impact of the tongue as it laps the surface of the fluid. Secondly, a substantial portion of liquid escapes from the edges of the cup-shaped portion of the tip of the tongue. Finally, some liquid is also lost by the jowls particularly as the imbibing process is momentarily ceased in order that the animal may regain normal breathing or allow the fluid to adjust itself in the stomach.

It is therefore advantageous that the liquid being imbibed be confined to a relatively small vessel. By confining the volume of water subjected to the splashing action of the tongue during the lapping process, more water may actually reach the jowl portion with each tongue movement than if a large flat open vessel be used. Moreover, it is not necessary that a deep vessel be used, since, when a dog imbibes its tongue is no more efficient in a deep vessel than it is in a shallow one. Indeed, the contrary is true. Thus by using a small shallow vessel surrounded by a splash wall the imbibing process of the dog is caused to be more efficient while at the same time the problem of splashing during the process is largely eliminated.

It is therefore an object of this invention to supply a generous quantity of pure drinking water in such an amount as may constitute a several days' supply thereof, thereby minimizing the effort to provide daily care of the pet without encountering the hazards and inconveniences generally associated with large open pans and vessels.

Another object of this invention is to provide means for minimizing the spillage of liquids from the container should the container be inadvertently displaced or upset.

Another object of this invention is to provide a means whereby the splash and drip of fluids occasioned by the imbibing of animals from said containers will be confined within the container and hence to eliminate the inconvenience caused by liquids deposited on floors, carpets, rugs and the like.

A further object of this invention is to provide a vessel which maintains a constant level of liquid.

A still further object of the invention is to provide a vessel which may be kept sanitary by disassembling it for easy and effective cleaning.

Still another object of this invention is to provide a drinking well which may be emptied and cleaned without the necessity of emptying the liquid storage reservoir.

The purposes of this invention are accomplished by using a two-piece, take-apart container of relatively thin molded organic plastic sheet material having a generally annular liquid reservoir chamber surrounding an inner wall in which a shallow pool of liquid is automatically maintained at a predetermined level. Thus, in its assembled condition, the outer portion of the container has a wall means defining a large hollow reservoir chamber which can contain a large quantity of water or other liquid, not only to provide a reservoir, but also to provide a substantial mass of several pounds for stability of the container against overturning. The inner section of the container provides the inner wall of the reservoir chamber as well as a drinking well, the upper portion of which is sufficiently large and high to accommodate the muzzle of the breed of animal using the dish and also to serve as a splash wall while the lower portion of the well is somewhat smaller and contains a shallow pool of the liquid being supplied to the particular animal. Holes or slots in the side of the lower well adjacent its bottom permit water to flow from the reservoir into the well and establish and automatically maintain the liquid pool surface at the uppermost of said holes or slots so long as the reservoir chamber is filled above said holes or slots. A removable closure, preferably in the upper wall of the reservoir chamber, may be provided for replenishing the liquid supply in the reservoir.

Still other features and objects of this invention will appear to those skilled in the art from the following detailed description of a preferred embodiment thereof, together with the accompanying drawings, wherein—

FIG. 1 is a perspective view of the receptacle of the invention in its assembled position;

FIG. 2 is an enlarged cross section of the assembled receptacle of FIG. 1 taken along the line 2—2 of FIG. 1;

FIG. 3 is an enlarged cross section of the inner portion of the receptacle of FIG. 1 taken on the line 3—3 of FIG. 1, and FIG. 4 is a reduced cross section of the entire receptacle taken along the line 3—3 of FIG. 1, showing it in tilted position for pouring from the inner well.

As shown in the drawings, the novel receptacle of the invention includes an outer element, generally designated 12, and an inner element, generally designated 14, releasably retained therewithin, which elements form an annular storage reservoir chamber 16 for the water 18 or other liquid to be supplied. The outer assembly may be of any desired shape, although shown on the drawings, and as used in the preferred embodiment thereof, it is round.

The outer element 12 has a simple construction readily moldable in one piece from sheet plastic material. Thus, it has a bottom wall 22 extending entirely thereacross, smoothly merging into upstanding side wall 24 which provides the outer liquid-containing wall. Extending inwardly from the upper portion of the side wall 24 is an annular top wall 26 having an inner downturned flange 28 with an inwardly directed radial lip 29 against which the inner element is releasably secured as hereinafter described. Suitable feet 54 are appropriately positioned on bottom wall 22 to raise the receptacle above its supporting surface and to aid in stabilizing it. There may be provided in annular top wall 26 a threaded plug 30 adapted to fit within a suitably threaded opening 32 in said wall to provide an airtight closure through which the reservoir chamber 16 may be filled with water or other liquid. Alternatively, the plug 30 may be eliminated and an air vent 31, comprising a hole placed in the upper portion of the inner downturned flange 28, located in such a position that in an assembled state the upper portion 40 of the inner element 14 covers and seals it. The inner element 14 is generally cup-shaped such that it may also be molded of sheet plastic material to provide a relatively shallow well with upwardly extending splash walls. More specifically, the configuration of the inner element 14 is such that its uppermost portion 40 is of a diameter to fit within the inwardly and downwardly tapered flange 28 and its lip 29, the uppermost portion 40 terminating in an inwardly directed annular surface 42 at its lower edge. Below said annular surface an intermediate downwardly and inwardly sloped frusto conical wall 44 extends further downwardly to another inwardly extending flange 46 defining the uppermost end of lower cylindrical wall 48 defining a lower or drinking well 50 which has a smaller radius than the upper well portion and which is relatively shallow. The wall 48 of the drinking well 50 is perpendicular and forms an interrupted concentric circle, within the upper annular walls, the circle being interrupted by a linear wall portion 51, lying upon a chord of said circle, and, together with walls 40, 42, 44 and 46 defines the inner wall of the reservoir chamber 16, with the intermediate and upper wall portions 40 and 44 providing a splash wall.

In the preferred embodiment, the width of the lower well in relation to its depth is in a ratio of at least 2:1 and preferably about 2.5:1 as shown. The width of the upper portion of the inner element in relation to the width of the well is in a ratio of approximately 2:1. Finally, the total depth of the inner element is approximately equal to the radius thereof and in relation to the depth of the drinking well is in a ratio of approximately 3:1. Preferably, too, the upper edge of the uppermost wall 40 is provided with a downturned flange 52 to aid in suppressing splashing. The bottom wall 49 of inner element 14 overlies outer element bottom wall 22 and is preferably spaced thereabove to prevent accumulation of dirt therebetween.

Adjacent the upper portion of the drinking well wall 48 is provided a generally horizontal slot 60 of limited linear extent on said linear portion 51 communicating with reservoir chamber 16 to define the surface of water or other liquid in well 50. At the bottom of the drinking well wall 48 is also provided feed opening 62 beneath slot 60 for allowing water or other liquid to flow into well 50 upon passage of air into chamber 16 through slot 60. Preferably said slot 60 is relatively wide to permit an adequate flow of liquid from said reservoir chamber 16 during the drinking process; and said feed opening 62 is relatively small to prevent larger impurities from entering said reservoir chamber 16.

Preferably inwardly and downwardly turned flange 52 is provided with a spout 64 directly above slot 60 and opening 62 to permit emptying of any water and any particles of dirt which might otherwise collect within said flange upon emptying well 50. The spout 64 is located on the same side of the inner bowl as the slot 60 and the feed opening 62 to permit emptying the well 50 without at the same time emptying reservoir chamber 16. Too, the generally frusto-conical shape of the inner wall aids in emptying water from well 50.

In the preferred embodiment of this invention the receptacle is constructed of linear polyethylene since that composition may be frozen with water in it without cracking. Thus, the dish may be filled with water, frozen and then placed in a warm place. As the ice melts, pets are provided with a source of ice water which they particularly enjoy.

In the use of the invention, first the plug 30 is removed and the reservoir chamber is filled with water or other liquid. The plug 30 is then reinserted to render said chamber airtight. If the alternative form, without a plug 30, is used, the inner element 14 is removed and the outer element 12 filled with water or other liquid to the height of the air vent 31. The inner element 14 is then reinserted and the air vent 31 covered, thus rendering the reservoir 16 airtight. Then the excess water collected in the inner bowl is poured out as is shown in FIG. 4 with the spout 64, slot 60, and opening 62 downward. Note that since the spout 64 is on the same side as the air vent 60 and the feed opening 62, and since the wall 48 of well 50 is perpendicular and on a linear wall portion 51 while the walls of the upper annular chamber are tapered outwardly, that all the water can be emptied from the well 50 except that which is sufficient to keep a water seal as at 51 over the air vent 60 and the feed opening 62, thus preventing air from entering the reservoir chamber 16 during the emptying process and preventing the water contained therein from escaping. This same emptying process may be used to clean the drinking well 50 without emptying the reservoir 16.

The receptacle is then placed upright in the position which is accessible to the animal imbibing therefrom. Water now flows through the slot 60 and the feed opening 62 until the slot is covered with liquid. Once this occurs, the water is automatically maintained at a constant level in the drinking well 50 since, as water is removed by the imbibing animal or by evaporation, air enters the reservoir chamber 16 through the slot 60 and water enters the drinking well 50 from the reservoir chamber 16 until the slot 60 is again covered with water.

If the receptacle should be overturned only the water which is in the drinking well 50 plus whatever water is above the slot 60 in an overturned condition of the bowl can spill.

To clean the receptacle the inner element 14 may be removed by grasping its upper downturned flange 52 and by pulling forceably upwardly, thus removing the inner bowl and exposing the outer bowl and its reservoir for cleaning. Reassembly is achieved simply by forcing the two elements together again so that they will be releasably held together by contact of their overlying wall sections.

Thus this invention assures a constant level of pure, uncontaminated drinking water for pets. The configuration of the inner bowl minimizes splashing and aids the animal in getting water to his jowls, and additionally, reduces the possible spillage resulting from upset.

It will be understood that various changes and modifications of this invention may be made within the spirit thereof and the scope of the appended claims by those skilled in the art.

I claim:

1. A constant level liquid dispensing receptacle from which animals may imbibe said liquid having spaced inner and outer side wall means with outer lower wall means extending continuously between said outer side wall means, inner lower wall means extending continuously between said inner side wall means and spaced upwardly from said outer lower wall means, and annular upper wall means extending between said inner and outer said wall means providing an enclosed, generally annular reservoir chamber between said inner and outer side wall means, with an open topped well defined by said inner side wall means, said well being of sufficient width to accommodate the muzzle of said imbibing animal, an opening having a removable airtight closure in one of said wall means, and slot means through said inner side wall means adjacent the lower end thereof providing liquid communication between said annular chamber and the open topped inner well defined by said inner wall means, the upper end of said slot means being effective to define an automatically maintained relatively shallow fluid level within said inner wall means upon filling said annular chamber with liquid to a level above said slot means and maintaining said closure in closed airtight position in said opening.

2. A constant level liquid dispensing receptacle from which animals may imbibe said liquid having spaced inner and outer side wall means with lower wall means extending between said outer side wall means and an annular upper wall means extending between said inner and outer side wall means, means for releasably retaining said inner side wall means within said outer side wall means providing in retained position an enclosed generally annular chamber between said inner and outer side wall means, with an open topped inner well defined by said inner side wall means, said well being of sufficient width to accommodate the muzzle of said imbibing animal, and slot means through said inner side walls means adjacent the lower end thereof providing liquid communication between said annular chamber and the open topped inner well defined by said inner wall means, the upper end of said slot means being effective to define an automatically maintained relatively shallow fluid level within said inner side wall means upon filling said annular chamber with liquid to a level above said slot means and maintaining said inner and outer wall means in retained position.

3. A constant level liquid dispensing receptacle from which animals may imbibe said liquid having spaced inner and outer side wall means with lower wall means extending between said outer side wall means and an annular upper wall means extending between said inner and outer side wall means providing an enclosed, generally annular chamber between said inner and outer side wall means with an open topped inner well defined by said inner side wall means, said well being of sufficient width to accommodate the muzzle of said imbibing animal, an opening having a removable airtight closure in one of said wall means other than said inner wall means, and slot means through said inner side wall means adjacent the lower end thereof providing liquid communication between said annular chamber and the open topped inner well defined by said inner wall means, the upper end of which said slot means being effective to define an automatically maintained relatively shallow fluid level within said inner wall means upon filling said annular chamber with liquid to a level above said slot means and maintaining said closure in closed airtight position.

4. A constant level liquid dispensing receptacle from which animals may imbibe said liquid having wall means defining an enclosed generally annular chamber surrounding an inner open topped, closed bottom well with slot means through said wall means adjacent the bottom of said well, said well being of sufficient width to accommodate the muzzle of said imbibing animal the upper end of such slot means being effective to define an automatically maintained relatively shallow liquid level within said well upon filling said annular chamber with liquid to a level above said slot means, and removable means in said wall means for exposing said annular chamber to be filled with liquid, a horizontal cross section of said well at the upper end of said slot means being at least about twice its depth.

5. A receptacle as claimed in claim 4 wherein the horizontal cross section of said well in the major portion thereof above the upper end of said slot is at least about twice that of said horizontal cross section at the upper end of said slot means, and is provided with outwardly and upwardly flaring walls.

6. A receptacle as claimed in claim 5 wherein the depth of said major portion of said well above the upper end of said slot is at least equal to the radius of said horizontal cross section of said major portion thereof.

7. A receptacle as claimed in claim 6 wherein the depth of said well in its entirety is in relation to the depth of said portion below the upper end of said slot in a ratio of at least approximately 3:1.

8. A constant level liquid dispensing receptacle from which animals may imbibe said liquid having uniformly thin wall means of organic plastic sheet material, said wall means defining an enclosed generally annular chamber with inner and outer sides, top and bottom, surrounding an inner open topped, closed bottom well with slot means through said wall means adjacent the bottom of said well, said well being of sufficient width to accommodate the muzzle of said imbibing animal, the upper end of said slot means being effective to define an automatically maintained relatively shallow liquid level within said well upon filling said annular chamber with liquid to a level above said slot means.

9. A receptacle as claimed in claim 8 wherein said organic plastic sheet material is linear polyethylene.

10. A receptacle as claimed in claim 8 wherein the closed bottom of said well is at a level at least as high as the bottom of said chamber.

11. A receptacle as claimed in claim 8 of two part construction with the outer side and bottom of said receptacle forming one part of integral molded construction with said bottom extending continuously between said sides and with the side and closed bottom of said receptacle of integral molded construction forming the other part and with the side and closed bottom of said well of said receptacle of integral molded construction forming the other part, said other part being so constructed and positioned within said first part that its bottom overlies the bottom of said first part.

12. A receptacle as claimed in claim 11 wherein overlapping inner side walls are provided on said parts for retaining said parts in assembled relationship.

13. A receptacle as claimed in claim 12 wherein closure means is provided in the top of said receptacle for feeding said chamber with liquid.

14. A receptacle as claimed in claim 12 wherein an opening is provided in said overlapping inner side wall of said outer part, with said overlapping outer side wall providing a closure for said opening in said inner side wall.

15. A receptacle as claimed in claim 8 wherein said slot means is in a linear portion of said wall means.

16. A receptacle as claimed in claim 15 wherein said well has an upwardly and outwardly flaring wall means with an inner downturned flange having spout means therein alined with said slot means.

References Cited in the file of this patent
UNITED STATES PATENTS
897,148    Ramirez _____ Aug. 25, 1908